United States Patent
Tanaka et al.

(10) Patent No.: US 8,152,692 B2
(45) Date of Patent: Apr. 10, 2012

(54) CONTROLLER FOR VEHICLE POWER TRANSMISSION APPARATUS

(75) Inventors: Naoto Tanaka, Okazaki (JP); Shinya Toyoda, Nissin (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 248 days.

(21) Appl. No.: 12/708,597

(22) Filed: Feb. 19, 2010

(65) Prior Publication Data

US 2010/0210414 A1 Aug. 19, 2010

(30) Foreign Application Priority Data

Feb. 19, 2009 (JP) .................................. 2009-037217

(51) Int. Cl.
*F16H 61/26* (2006.01)
(52) U.S. Cl. ...................................................... 477/162
(58) Field of Classification Search ................... None
See application file for complete search history.

(56) References Cited

U.S. PATENT DOCUMENTS

| 6,110,072 A | * | 8/2000 | Harada et al. ................. 477/157 |
| 6,135,919 A | | 10/2000 | Shimakura |
| 7,044,890 B2 | * | 5/2006 | Kojima et al. ................. 477/175 |

FOREIGN PATENT DOCUMENTS

| JP | 61215853 | 9/1986 |
| JP | 2000027992 A | 1/2000 |
| JP | 2003139230 A | 5/2003 |
| JP | 2008275000 | 11/2008 |

* cited by examiner

*Primary Examiner* — Dirk Wright
(74) *Attorney, Agent, or Firm* — Gifford, Krass, Sprinkle, Anderson & Citkowski, P.C.

(57) ABSTRACT

A discharge capacity reduction device that, while neutral control is performed, reduces the discharge capacity of an oil pump that is driven by the engine is provided, so that the load applied to the oil pump is reduced. Thus, the load applied to the engine is reduced and it is possible to further reduce the engine output, so that it is possible to further improve fuel economy.

8 Claims, 6 Drawing Sheets

FIG.9

CONTROLLER FOR VEHICLE POWER TRANSMISSION APPARATUS

INCORPORATION BY REFERENCE

The disclosure of Japanese Patent Application No. 2009-037217 filed on Feb. 19, 2009 including the specification, drawings and abstract is incorporated herein by reference in its entirety.

BACKGROUND OF THE INVENTION

1. Field of the Invention

The invention relates to a controller for a vehicle power transmission apparatus, and in particular, to improvement of fuel economy during neutral control.

2. Description of the Related Art

For hydraulic pressure supplied to a hydraulic pressure control circuit of a vehicle power transmission apparatus, typically, working fluid that is discharged from a mechanical oil pump that is driven by an engine is supplied as the source pressure. In conventional vehicles, fixed discharge pumps, of which the discharge capacity is invariable, and gear pumps are often used. As described in Japanese Patent Application Publication No. 61-215853 (JP-A-61-215853), for example, an apparatus is already available that includes a first and second pump, and in which the destination of each of these pumps is appropriately changed via an electromagnetic valve depending on the state of the vehicle, whereby the discharge capacity of the entire oil pump is changed.

In recent years, a vehicle power transmission apparatus is realized that is capable of performing neutral control that suppresses the idling load of the engine by bringing a power transmission path into a power transmission suppression state by bringing an engagement device, interposed between an engine and driving wheels in a power transmission path, into a slip state or a release state when predetermined neutral control conditions, such as that the foot brake is in an on state and the vehicle speed is zero while a travel position is selected, are satisfied. A controller for an automatic transmission described in Japanese Patent Application Publication No. 2008-275000 (JP-A-2008-275000) is an example of such an apparatus.

In such a vehicle power transmission apparatus, the load applied to the engine is reduced to improve fuel economy by performing the neutral control. However, the technology for further improving fuel economy is considered necessary from the demand raised by the growing environmental awareness.

SUMMARY OF THE INVENTION

The invention provides a controller for a vehicle power transmission apparatus capable of performing neutral control, with which apparatus it is possible to further improve fuel economy during the neutral control.

A first aspect of the invention is a controller for a vehicle power transmission apparatus having an engagement device that is provided between an engine and a driving wheel in a power transmission path, the controller including: a neutral control section that, when a predetermined neutral control condition is satisfied while a travel position is selected, brings the engagement device into a slip state or a release state to bring the power transmission path into a power transmission suppression state so that an idling load of the engine is suppressed; and a discharge capacity reduction device that, while neutral control is performed, reduces a discharge capacity of an oil pump that is driven by the engine.

A second aspect of the invention is a method of controlling a vehicle power transmission apparatus having an engagement device that is provided between an engine and a driving wheel in a power transmission path, the method including: performing neutral control in which, when a predetermined neutral control condition is satisfied while a travel position is selected, the engagement device is brought into a slip state or a release state to bring the power transmission path into a power transmission suppression state so that an idling load of the engine is suppressed; and, while the neutral control is performed, reducing a discharge capacity of an oil pump that is driven by the engine.

With the controller for a vehicle power transmission apparatus of the invention, while neutral control is performed, the discharge capacity of the oil pump that is driven by the engine is reduced, so that the load applied to the oil pump is reduced. Thus, the load applied to the engine is reduced and it is possible to further reduce the engine output, so that it is possible to further improve fuel economy. Also with the method of controlling a vehicle power transmission apparatus of the invention, a similar effect is obtained.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Embodiments of the invention will be described in detail below with reference to drawings. The drawings related to the following embodiments are simplified or modified as needed and therefore, the ratio between dimensions of the respective portions, the shapes thereof, etc. are not always drawn accurately.

Figure 1:
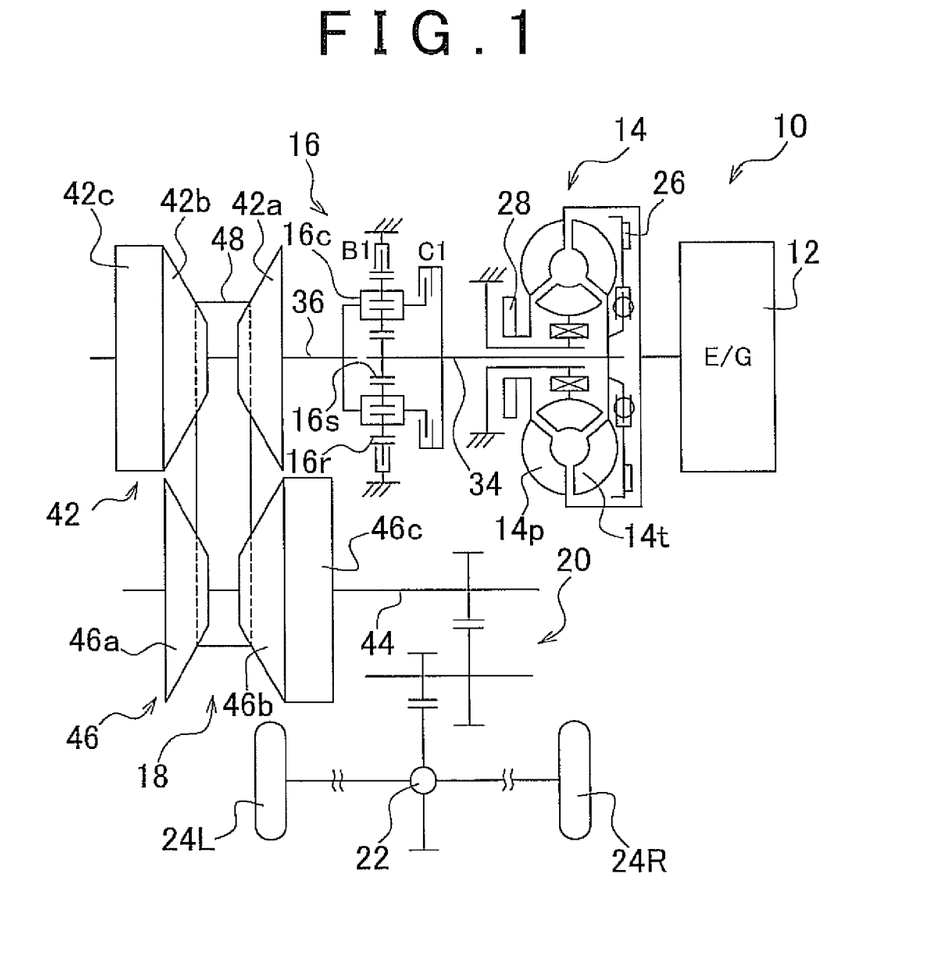
FIG. 1 is a skeleton diagram of a vehicle power transmission apparatus that is an embodiment of the invention.

FIG. 1 is a skeleton diagram of a vehicle power transmission apparatus 10 that is an embodiment of the invention. The vehicle power transmission apparatus 10 is a transversely mounted automatic transmission and suitably used in a front-engine/front-drive (FF) vehicle. The vehicle power transmission apparatus 10 includes an engine 12 that functions as a power source for driving the vehicle. The output of the engine 12, which is an internal combustion engine, is transmitted to a final reduction gear 22 through a crankshaft of the engine 12, a torque converter 14, which functions as a hydraulic transmission device, a forward/reverse travel switching device 16, an input shaft 36, a belt-type continuously variable transmission 18, an output shaft 44, and a reduction gear 20, and distributed to right and left driving wheels 24L, 24R. The belt-type continuously variable transmission 18 of this embodiment functions as the automatic transmission of the invention.

The torque converter 14 includes a pump vane wheel 14p that is connected to the crankshaft of the engine 12 and a turbine blade wheel 14t that is connected to the forward/reverse travel switching device 16 through a turbine shaft 34. The torque converter 14 transmits power via fluid. A lock-up clutch 26 is provided between the pump blade wheel 14p and the turbine blade wheel 14t. Supply of hydraulic pressure is switched between the supply to an engagement-side hydraulic chamber and the supply to a release-side hydraulic chamber via a switch valve of the hydraulic controller (not shown) or the like so that the lock-up clutch 26 is engaged or released. When the clutch is fully engaged, the pump vane wheel 14p and the turbine blade wheel 14t are rotated together. The pump vane wheel 14p is provided with a mechanical oil pump 28, described later, that generates hydraulic pressure for controlling the shift of the belt-type continuously variable transmission 18 and generating a belt clamping force, as well as supplying lubricating oil to various portions.

Figure 2:
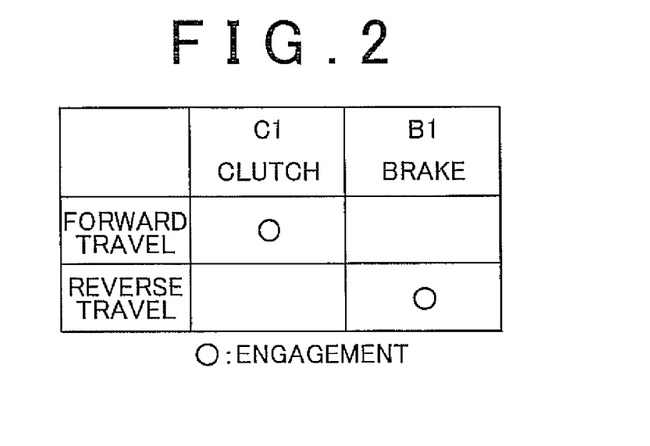
FIG. 2 is a engagement operation table of the vehicle power transmission apparatus shown in FIG. 1.

The forward/reverse travel switching device 16 is mainly constituted of a double-pinion type planetary gear. The turbine shaft 34 of the torque converter 14 is integrally connected to a sun gear 16s. The input shaft 36 of the belt-type continuously variable transmission 18 is integrally connected to a carrier 16c. The carrier 16c and the sun gear 16s are selectively connected to each other via a forward-travel clutch C1. A ring gear 16r is selectively fixed to a housing via a reverse-travel brake B1. The forward-travel clutch C1 and the reverse-travel brake B1 each are a hydraulic friction engagement device that is brought into a friction engagement by a hydraulic cylinder. As shown in FIG. 2, when the forward-travel clutch C1 is engaged and the reverse-travel brake B1 is released, the forward/reverse travel switching device 16 is caused to be integrally rotated and a forward-drive power transmission path is established, so that the rotation in the forward-drive direction is transmitted to the belt-type continuously variable transmission 18 side without reduction in speed. On the other hand, when the reverse-travel brake B1 is engaged and the forward-travel clutch C1 is released, a reverse-drive power transmission path is established in the forward/reverse travel switching device 16, so that the input shaft 36 is rotated in the direction opposite to the direction of the rotation of the turbine shaft 34 and the rotation in the reverse-drive direction is transmitted to the belt-type continuously variable transmission 18 side. When the forward-travel clutch C1 and the reverse-travel brake B1 both are released, the forward/reverse travel switching device 16 is brought into a neutral state (interruption state), in which power transmission is interrupted.

The belt-type continuously variable transmission 18 includes: an input-side variable pulley 42, which is an input-side member provided on the input shaft 36 and whose effective diameter is variable; an output-side variable pulley 46, which is an output-side member provided on the output shaft 44 and whose effective diameter is variable; and a power transmission belt 48, which functions as a power transmission member that is wound around and in friction contact with the variable pulleys 42, 46. Power is transmitted by the friction between the variable pulleys 42, 46 and the power transmission belt 48. The variable pulleys 42 (46) include: a fixed sheave 42a (46a), which is fixed to the input shaft 36 (output shaft 44); a movable sheave 42b (46b) provided so as not to be able to rotate relative to the input shaft 36 (output shaft 44) around the axis thereof and so as to be able to move in the axial direction; and an input-side hydraulic cylinder 42c (output-side hydraulic cylinder 46c) that gives a thrust force for changing the width of the V-shaped groove between the fixed sheave 42a (46a) and the movable sheave 42b (46b). The hydraulic pressure of the input-side hydraulic cylinder 42c of the input-side variable pulley 42 is controlled to change the width of the V-shaped groove of the variable pulleys 42, 46, so that the winding diameter (effective diameter) of the power transmission belt 48 is changed. Thus, the speed ratio γ(=input shaft rotation speed Nin/output shaft rotation speed Nout) is continuously changed. Meanwhile, the hydraulic pressure of the output-side hydraulic cylinder 46c of the output-side variable pulley 46 is controlled to change the clamping force for clamping the power transmission belt 48. The power transmission belt 48 has a structure, in which a plurality of layered steel bands are fitted into each of the right and left sides of a plurality of metallic pieces, for example.

Figure 3:
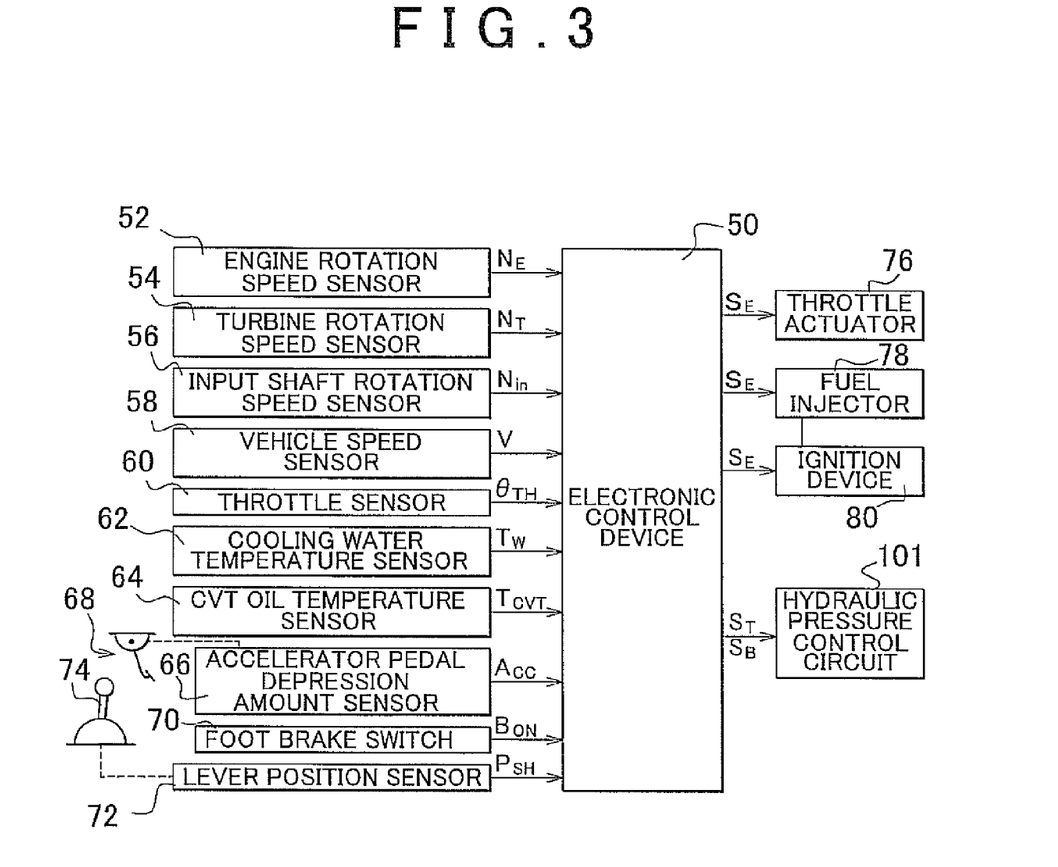
FIG. 3 is a block diagram for explaining a main portion of a control system that is provided in a vehicle to control the vehicle power transmission apparatus shown in FIG. 1.

FIG. 3 is a block diagram for explaining a main portion of a control system that is provided in the vehicle to control the vehicle power transmission apparatus 10 shown in FIG. 1. An electronic control device 50 that functions as the shift control device of the invention includes a so-called microcomputer, which has a central processing unit (CPU), a random access memory (RAM), a read only memory (ROM), an input/output interface, etc. The CPU is configured to perform the control of output from the engine 12, the control of shift of the belt-type continuously variable transmission 18, the control of belt clamping force, the control of torque capacity of the lock-up clutch 26, etc. by processing signals according to the program stored in advance in the ROM while using the temporary storage function of the RAM. Depending on the purpose, the electronic control device 50 is configured such that separate CPUs for controlling the engine, for controlling the hydraulic pressure for the continuously variable transmission 18, and for controlling the hydraulic pressure for the lock-up clutch 26, for example, are used as needed.

Supplied to the electronic control device 50 are, for example: a signal indicating a crankshaft rotation angle (position) ACR (°) and a crankshaft rotation speed corresponding to a rotation speed $N_E$ of the engine 12 (engine rotation speed) that are detected by an engine rotation speed sensor 52; a signal indicating a rotation speed (turbine rotation speed) $N_T$ of the turbine shaft 34 that is detected by a turbine rotation speed sensor 54; a signal indicating a rotation speed (input shaft rotation speed) Nin of the input shaft 36 that is the input rotation speed of the continuously variable transmission 18 that is detected by an input shaft rotation speed sensor 56; a vehicle speed signal indicating a vehicle speed V corresponding to a rotation speed (output shaft rotation speed) Nout, that is, an output shaft rotation speed Nout, of the output shaft 44 that is the output rotation speed of the continuously variable transmission 18 that is detected by a vehicle speed sensor (output shaft rotation speed sensor) 58; a throttle valve opening degree signal indicating a throttle valve opening degree $\theta_{TH}$ of an electronic throttle valve provided in the intake piping of the engine 12 that is detected by a throttle sensor 60; a signal indicating a cooling water temperature $T_w$ of the engine 12 that is detected by a cooling water temperature sensor 62; a signal indicating an oil temperature $T_{CVT}$ in a hydraulic circuit of the continuously variable transmission 18, etc. that is detected by a CVT oil temperature sensor 64; an accelerator pedal depression amount indicating an accelerator pedal depression amount Acc corresponding to the amount of depression of an accelerator pedal 68 that is detected by an accelerator pedal depression amount sensor 66; a brake operation signal indicating the occurrence $B_{ON}$ of the operation of a foot brake, used as a service brake, that is detected by a foot brake switch 70; and an operation position signal indicating a lever position (operation position) $P_{SH}$ of a shift lever 74 that is detected by a lever position sensor 72.

The electronic control device 50 outputs engine output control command signals $S_E$ for controlling output from the engine 12, such as a throttle signal for driving a throttle actuator 76 for controlling opening and closing of the electronic throttle valve, an injection signal for controlling the amount of fuel that is injected by a fuel injector 78, and an injection timing signal for controlling the timing of ignition of the engine 12 performed by an ignition device 80. In addition, the electronic control device 50 outputs, to a hydraulic pressure control circuit 101, a shift control command signal $S_T$ for changing the speed ratio γ of the belt-type continuously variable transmission 18, such as a command signal for driving shift control solenoid valves DS1 and DS2 for controlling the flow rate of the working fluid supplied to the input-side hydraulic cylinder 42c, and outputs clamping force control command signals $S_B$ for controlling the clamping force of the power transmission belt 48, such as a command signal for driving a linear solenoid valve SLS for regulating belt-clamping-force control hydraulic pressure Pd and a command signal for driving a linear solenoid valve SLT and a linear solenoid valve SLS for controlling line hydraulic pressure PL.

The shift lever 74 is disposed near the driver's seat, for example, and is designed to be manually operated to five lever positions, "P", "R", "N", "D", and "L" that are arranged in order.

The "P" position (range) is a parking position that brings about a neutral state, in which the power transmission path of the vehicle power transmission apparatus 10 is released, that is, in which the power transmission by the vehicle power transmission apparatus 10 is interrupted, and at which parking position the rotation of the output shaft 44 is mechanically prevented (locked) by a mechanical parking mechanism. The "R" position is a reverse-travel position, at which the direction of rotation of the output shaft 44 is reversed. The "N" position is a neutral position, at which the power transmission by the vehicle power transmission apparatus 10 is interrupted. The "D" position is a forward-travel position, at which the automatic shifting is performed by establishing the automatic shift mode within the shift range, in which shifting of the belt-type continuously variable transmission 18 is allowed. The "L" position is an engine brake position, at which a strong engine brake is applied. The "P" position and the "N" position are the no-travel position that is selected when it is intended to bring the power transmission path into the neutral position to prevent the vehicle from running. The "R" position, the "D" position, and the "L" position are the travel position that is selected when it is intended to bring the power transmission path into the power transmission enabled state, in which the power transmission through the power transmission path is enabled, to allow the vehicle to run.

Figure 4:
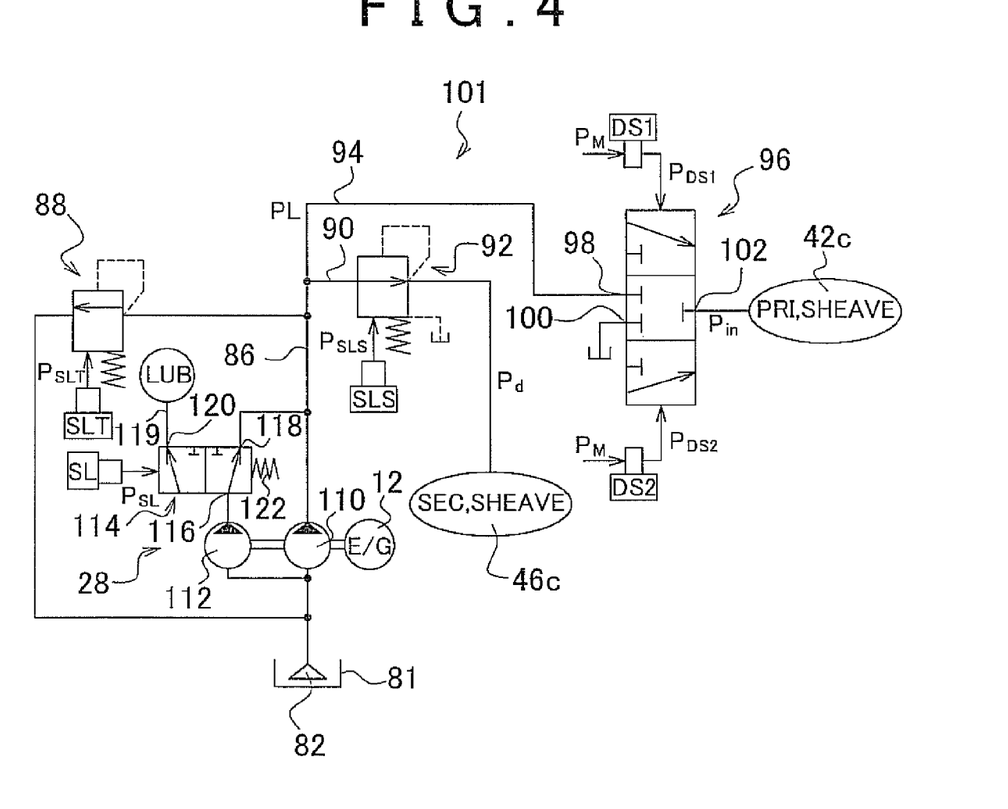
FIG. 4 schematically shows part of a hydraulic pressure control circuit for supplying working fluid to an input-side hydraulic pressure cylinder and an output-side hydraulic cylinder.

FIG. 4 schematically shows part of the hydraulic pressure control circuit 101 for supplying working fluid to the input-side hydraulic cylinder 42c and the output-side hydraulic cylinder 46c. In FIG. 4, the working fluid sucked from an oil pan 81 through a strainer 82 is pressurized by the oil pump 28 described later and is supplied to a source pressure supply hydraulic line 86 to provide the source pressure of the line hydraulic pressure PL. The hydraulic pressure of the source pressure supply hydraulic line 86, that is, the pump discharge pressure is regulated by a regulator valve 88 that is controlled based on a signal hydraulic pressure $P_{SLT}$ that is output from the solenoid valve SLT, to provide the line hydraulic pressure PL. When the line hydraulic pressure PL is supplied to a hydraulic line 90 that branches off from the source pressure supply hydraulic line 86, the line hydraulic pressure PL is regulated by a regulator valve 92 that is provided in the hydraulic line 90. The regulator valve 92 is a regulator valve, of which the source pressure is the line pressure PL, and which is controlled based on the signal hydraulic pressure $P_{SLS}$ that is output from the belt clamping force control solenoid valve SLS.

The working fluid, of which the pressure is regulated, is supplied to the output-side hydraulic cylinder 46c (SEC. SHEAVE). Regulating the hydraulic pressure Pd (belt-clamping-force control hydraulic pressure Pd) supplied to the output-side hydraulic cylinder 46c is controlled in this way, so that the belt clamping force of the power transmission belt 48 looped over the input-side variable pulley 42 and the output-side variable pulley 46 is adjusted.

The working fluid that is supplied from the source pressure supply hydraulic line 86 to a hydraulic line 94 is supplied to a speed ratio control valve 96. The speed ratio control valve 96 is caused to switch between connection and disconnection of a line hydraulic pressure supply port 98, a drain port 100, and an output port 102 of the input-side hydraulic cylinder 42c of the input-side variable pulley 42, by a shift control solenoid valve DS1 and a shift control solenoid valve DS2. When the shift control solenoid valve DS1 is in an ON state, for example, the line hydraulic pressure supply port 98 and the output port 102 are allowed to communicate with each other and the line hydraulic pressure PL is supplied to the input-side hydraulic cylinder 42c. On the other hand, when the shift control solenoid valve DS2 is in an ON state, the output port 102 and the drain port 100 are allowed to communicate with each other and the working fluid is discharged from the input-side hydraulic cylinder 42c. When the supply and discharge of working fluid to and from the input-side hydraulic cylinder 42c is controlled in this way, the loop radius of the power transmission belt 48 that is wound around the input-side variable pulley 42 is appropriately varied and the speed ratio of the belt-type continuously variable transmission 18 is continuously varied. The line hydraulic pressure PL of this embodiment is controlled via the regulator valve 88 with the use of the solenoid valve SLT. The belt clamping force control hydraulic pressure Pd (MPa) is supplied to the hydraulic pressure chamber in the output-side hydraulic cylinder 46c is controlled via the regulator valve 92 with the use of the belt-clamping-force control solenoid valve SLS. These hydraulic pressures are independently controlled. A modulator hydraulic pressure $P_M$ is the source pressure of a control hydraulic pressure $P_{DS1}$, which is the output hydraulic pressure of the solenoid valve DS1 whose duty factor is controlled by the electronic control device 50, and a control hydraulic pressure $P_{DS2}$, which is the output hydraulic pressure of the solenoid valve DS2 whose duty factor is controlled by the electronic control device 50. The modulator hydraulic pressure $P_M$ is regulated at a certain pressure by a modulator valve (not shown). The various solenoid valves provided in the hydraulic pressure control circuit 101 are suitably controlled by the electronic control device 50 based on the various data supplied from a vehicle speed sensor (not shown), the accelerator pedal depression amount sensor, etc.

Figure 5:
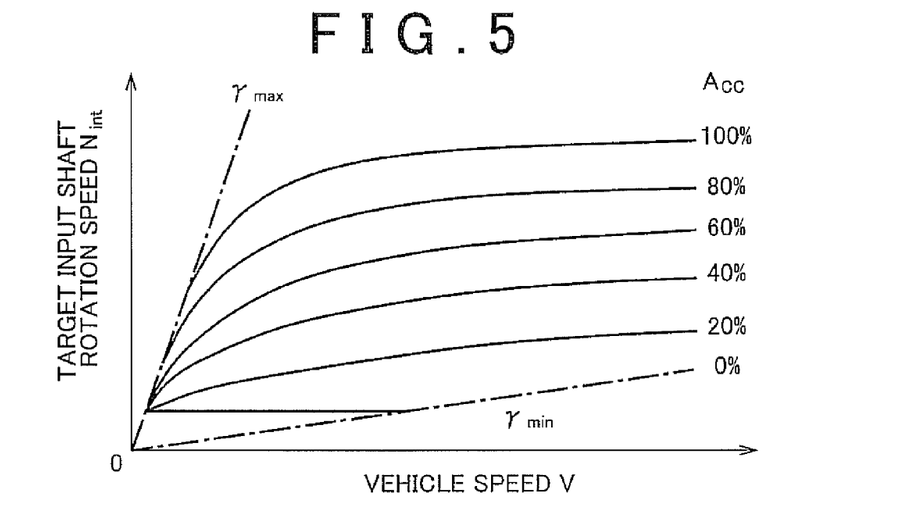
FIG. 5 is a diagram showing an example of a shift map used to determine a target input rotation speed in shift control of a continuously variable transmission shown in FIG. 1.

The relation (shift map) between vehicle speed V and target input shaft rotation speed Nint that is the target input shaft rotation speed of the continuously variable transmission 18, which relation is obtained empirically with the aim of achieving both drivability and fuel economy of the vehicle as shown in FIG. 5, for example, and in which relation the accelerator pedal depression amount Acc is a parameter, is stored in advance and the target input shaft rotation speed Nint of the input shaft 36, which functions as a rotary member, is set on the basis of the relation (shift map), based on the vehicle state that is expressed by the actual vehicle speed V and the accelerator pedal depression amount Acc. In order to make an actual input shaft rotation speed Nin (hereinafter referred to as the "actual input shaft rotation speed Nin" when it may be confused with the target input shaft rotation speed Nint) equal to the set target input shaft rotation speed Nint, shifting of the belt-type continuously variable transmission 18 is performed by feedback control based on the rotation speed difference ΔNin (=Nint−Nin) between the actual input shaft rotation speed Nin and the target input shaft rotation speed Nint. Specifically, the V-shaped groove widths of both of the variable pulleys 42, 46 are varied by supply and discharge of the working fluid to and from the input-side hydraulic cylinder 42c, so that the speed ratio γ is continuously varied by feedback control.

The shift map shown in FIG. 5 corresponds to the shift conditions and may be an empirically-obtained mathematical expression whose parameters are the accelerator pedal depression amount Acc, the vehicle speed V, etc. The shift map is such that a target input shaft rotation speed Nint is set that causes a higher speed ratio γ when the vehicle speed V is lower and the accelerator pedal depression amount Acc is larger. Since the vehicle speed V corresponds to the output shaft rotation speed Nout, the target input shaft rotation speed Nint, which is the target value of the input shaft rotation speed Nin, corresponds to a target speed ratio γ*(=Nint/Nout), and is determined within a range of a minimum speed ratio γmin to a maximum speed ratio γmax of the continuously variable transmission 18.

However, although the target input shaft rotation speed Nint may be set as the target value of the input shaft rotation speed Nin, it is preferable that a basic target input shaft rotation speed Nint_bc be set, which is a value obtained by processing the target input shaft rotation speed Nint according to the driving state, such as an accelerating state, a decelerating state (coasting state), or a shifting state, and a transitional target input shaft rotation speed Nint_trs be set that is the target value of the ultimate input shaft rotation speed Nin, based on the basic target input shaft rotation speed Nint_trs. Thus, in this case, shifting of the continuously variable transmission 18 is performed by feedback control based on the rotation speed difference (deviation) ΔNint_trs (=Nint_trs−Nin) between the transitional target input shaft rotation speed Nint_trs and the actual input shaft rotation speed Nin so that the actual input shaft rotation speed Nin is made equal to the rotation speeds Nint_trs.

As shown in FIG. 4, the oil pump 28 includes fixed displacement-type first and second pumps 110 and 112 that are driven by the engine 12. Each of the first and second pumps 110 and 112 is, for example, a well-known gear pump including an internal gear and an external gear that mesh with each other. The driving force from the engine 12 rotates the internal gear, so that the working fluid sucked through the strainer 82 is discharged from a discharge port (not shown). The working fluid discharged from the first pump 110 is supplied to the source pressure supply hydraulic line 86. On the other hand, the destination, to which the working fluid discharged from the second pump 112 is supplied, is selected via a switching valve 114.

The switching valve 114 includes: an input port 116, to which the working fluid discharged from the second pump 112 is supplied; a first output port 118 that is connected to the source pressure supply hydraulic line 86; a second output port 120 that is connected to a lubrication oil line 119 (which functions as the another hydraulic line of the invention) of the lubrication oil that is supplied to various lubricated elements LUB of the power transmission apparatus 10; a spool (not shown) for switching the hydraulic lines in the switching valve 114; a spring 122 that urges the spool in one direction; and a hydraulic chamber (not shown) that receives the switching hydraulic pressure $P_{SL}$, output from a switching solenoid valve SL.

When the switching hydraulic pressure $P_{SL}$, is not output from the switching solenoid valve SL, the spool is moved in the one direction by the urging force of the spring 122. When this occurs, the switching valve 114 allows the input port 116 and the first output port 118 to communicate with each other as shown in FIG. 4. Thus, the working fluid is supplied from the first and second pumps 110 and 112 to the source pressure supply hydraulic line 86. On the other hand, when the switching hydraulic pressure $P_{SL}$, is output from the switching solenoid valve SL, the spool is moved in the other direction against the urging force of the spring 122. In the switching valve 114, the hydraulic lines are switched so that the input port 116 and the second output port 120 are allowed to communicate with each other. Thus, the working fluid discharged from the second pump 112 is supplied to the various lubricated elements LUB of the power transmission apparatus 10 through the lubrication oil line 119.

Figure 6:
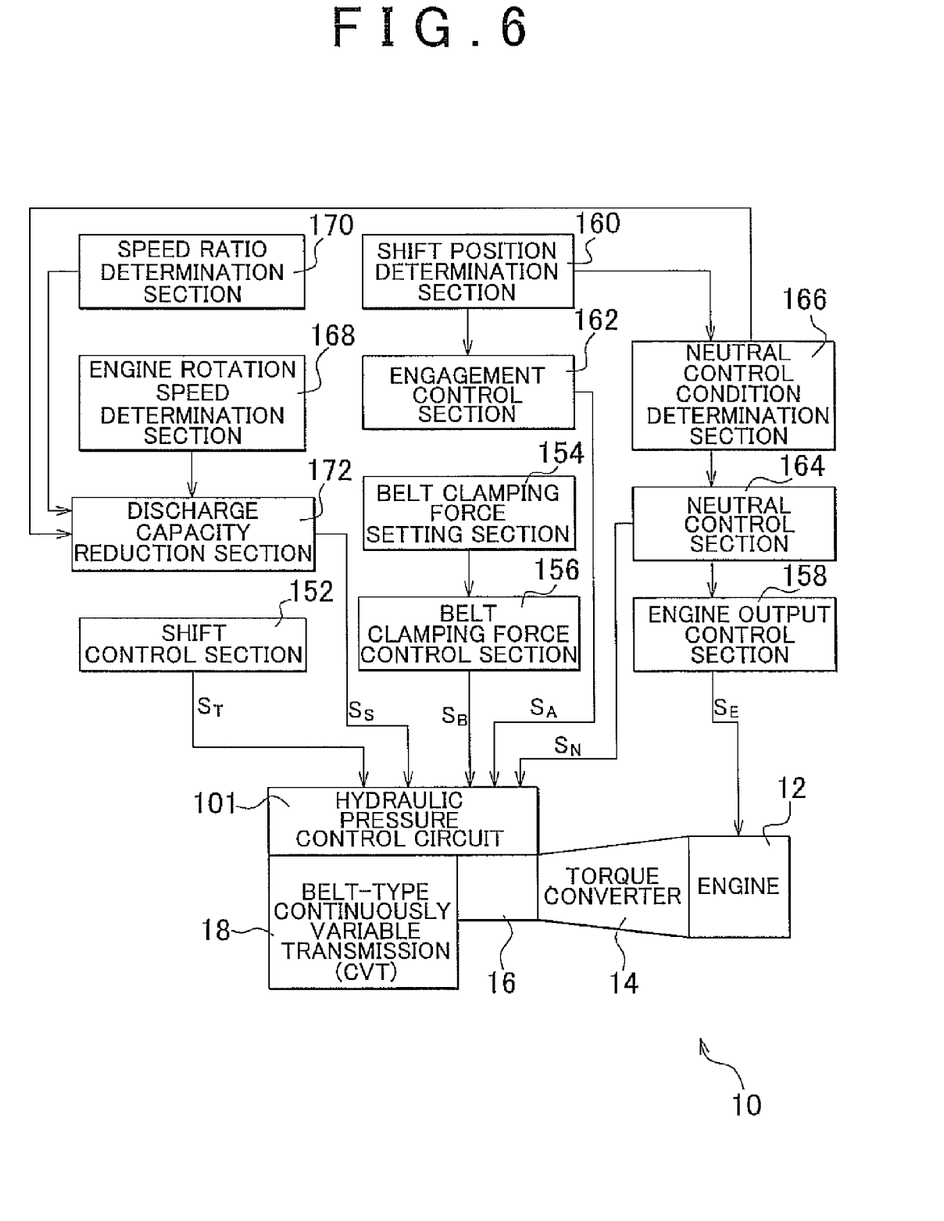
FIG. 6 is a functional block diagram for explaining a main portion of control functions provided by an electronic control device.

FIG. 6 is a functional block diagram for explaining the main portion of the control function provided by the electronic control device 50. In FIG. 6, a shift control section 152 successively sets the target input shaft rotation speed Nint corresponding to the target speed ratio γ*(=Nint/Nout) based on the vehicle state that is expressed by the actual vehicle speed V and the accelerator pedal depression amount Acc based on the previously stored shift map (shift condition) as shown in FIG. 5, for example.

The shift control section 152 shifts the continuously variable transmission 18 by performing the feedback control for controlling the loop diameter (effective diameter) of the power transmission belt 48 in the input-side variable pulley 42 so that the actual speed ratio γ(=Nin/Nout) of the continuously variable transmission 18 is brought closer to the target speed ratio γ*. When described with a focus placed on the actual input shaft rotation speed Nin, the shift control section 152 shifts the continuously variable transmission 18 by performing the feedback control according to the rotation speed difference ΔNin so that the actual input shaft rotation speed Nin is made equal to the set target input shaft rotation speed Nint, that is, so that the rotation speed difference ΔNin (=Nint−Nin) is eliminated. Specifically, the shift control section 152 shifts the continuously variable transmission 18 by controlling the supply and discharge of the working fluid to and from the input-side hydraulic cylinder (input-side hydraulic actuator) 42c. Specifically, the shift control section 152 outputs, to the hydraulic pressure control circuit 101, the shift control command signal (hydraulic pressure command) ST that varies the widths of the V-shaped grooves of the variable pulleys 42 and 46 by performing the feedback control for controlling the flow rate $Q_{CVT}$ of the working fluid supplied to the input-side hydraulic cylinder 42c. In the above feedback control, the flow rate $Q_{CVT}$ of the working fluid supplied to the input-side hydraulic cylinder 42c corresponds to the speed of change of the speed ratio γ(shift speed) at the time of shifting and is determined by a control equation that is set in advance.

Figure 7:
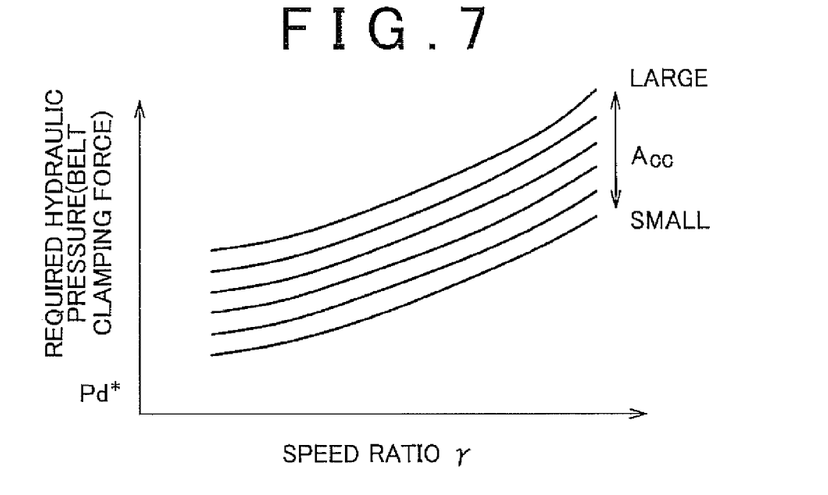
FIG. 7 is a diagram showing an example of a required hydraulic pressure map that is used to determine a required hydraulic pressure according to a speed ratio etc. in clamping force control of the continuously variable transmission shown in FIG. 1.

On the basis of the belt clamping force map, shown in FIG. 7, for example, that is empirically obtained and stored in advance, a belt clamping force setting section 154 sets a belt clamping force Pd* based on the vehicle state that is expressed by the actual accelerator pedal depression amount Acc and the actual speed ratio γ(=Nin/Nout) that is calculated from the actual input shaft rotation speed Nin and the output shaft rotation speed Nout by the electronic control device 50. Specifically, the belt clamping force setting section 154 sets the belt clamping force Pd of the output-side hydraulic cylinder 46c to obtain the belt clamping force Pd*. When the vehicle speed V is equal to or lower than the lower limit vehicle speed, above which the speed ratio can be detected, the actual speed ratio cannot be calculated and in this case, for example, the belt clamping force setting section 154 sets the belt clamping force Pd* and the belt clamping force Pd, regarding the actual speed ratio γ as the maximum speed ratio γmax.

A belt clamping force control section 156 adjusts the belt clamping force Pd so as not for the power transmission belt 48 to slip. Specifically, the belt clamping force control section 156 outputs, to the hydraulic pressure control circuit 101, the clamping force control command signal $S_B$ for adjusting the belt clamping force Pd of the output-side hydraulic cylinder 46c so as to be able to obtain the belt clamping force Pd* set by the belt clamping force setting section 154.

The hydraulic pressure control circuit 101 controls the amount of supply and discharge of the working fluid to and from the input-side hydraulic cylinder 42c by operating the shift control solenoid valve DS1 and the shift control solenoid valve DS2 so as to perform shifting of the belt-type continuously variable transmission 18 according to the above shift control command signal $S_T$ and at the same time, adjusts the belt clamping force Pd by operating the linear solenoid valve SLS so as to vary the belt clamping force Pd* according to the above clamping force control command signal $S_B$.

In order to control output from the engine 12, an engine output control section 158 outputs engine output control command signals $S_E$, such as a throttle signal, an injection signal, and an ignition timing signal, to the throttle actuator 76, the fuel injector 78, and the ignition device 80, respectively. For example, the engine output control section 158 outputs, to the throttle actuator 76, the throttle signal for opening and closing the electronic throttle valve so as to achieve the throttle valve opening degree $\theta_{TH}$ according to the accelerator pedal depression amount Acc to control engine torque $T_E$.

A shift position determination section 160 determines the current lever position $P_{SH}$ and determines the history of operation of the shift lever 74, based on the lever position $P_{SH}$, that is, based on the on signal of the lever position $P_{SH}$. For example, the shift position determination section 160 makes an N-to-D shift determination, an N-to-R shift determination, a "D" position determination, an "N" position determination, an "R" position determination, etc. based on the lever position $P_{SH}$.

When the shift position determination section 160 determines that the N-to-D shift or the N-to-R shift has been performed, an engagement control section 162 outputs the shift command signal $S_A$ for outputting the signal hydraulic pressure $P_{SLS}$ for regulating the line hydraulic pressure PL and outputting the control hydraulic pressure $P_{SLT}$ for moderately increasing the engagement hydraulic pressure to suppress the engagement shock to control the transitional engagement state of the forward-travel clutch C1 and the reverse-travel brake B1. For example, the engagement control section 162 outputs, to the hydraulic pressure control circuit 101, an engagement transitional hydraulic pressure command signal pcltexc as the command signal SLTDUTY for controlling the duty factor of the linear solenoid valve SLT.

When neutral control conditions are satisfied, that is, for example, when the shift position determination section 160 determines that the lever position $P_{SH}$ is at the "D" position or at the "R" position and that the foot brake is in an ON state $B_{ON}$, a neutral control section 164 brings the forward-travel clutch C1 or the reverse-travel brake B1 of the forward/reverse travel switching device 16 into a slip state or a release state to bring the power transmission path into a power transmission suppression state, whereby the idling load of the engine 12 is suppressed. The neutral control section 164 outputs, to the hydraulic pressure control circuit 101, the command signal $S_N$ for bringing the forward-travel clutch C1 or the reverse-travel brake B1 into the slip state or the release state. Thus, the load applied to the engine 12 is reduced and therefore, the engine output control section 158 outputs the command signal $S_E$ for reducing the amount of fuel injection, so that fuel economy is improved. The forward-travel clutch C1 or the reverse-travel brake B1 functions as the engagement device of the invention.

A neutral control condition determination section 166 determines whether a predetermined neutral control condition(s) are satisfied when the shift lever 74 is at the travel position, that is, the "D" or "R" position. For example, the predetermined neutral control conditions are that the vehicle is stopped, that the accelerator pedal 68 is not depressed, and that the foot brake pedal is depressed. More specifically, for example, when the vehicle speed V is equal to or lower than a predetermined stop determination value and the foot brake switch 70 is in the ON state $B_{ON}$ while the lever position $P_{SH}$ is the "D" position or the "R" position, the neutral control condition determination section 166 determines that the neutral control condition is satisfied.

During the neutral control, an engine rotation determination section 168 determines whether the engine rotation speed $N_E$ is equal to or lower than a predetermined value α that is set in advance. During the neutral control, the engine rotation speed $N_E$ is controlled so as to be equal to or lower than the predetermined value α. The engine rotation determination section 168 functions as a securing section that determines whether the neutral control is normally performed. Thus, the predetermined value α is set as a threshold value of the rotation speed, which threshold value is used during the neutral control.

A rotation speed ratio determination section 170 determines whether a rotation speed ratio e of the torque converter 14 (rotation speed of turbine blade wheel 14t)/(rotation speed of pump vane wheel 14p) is equal to or higher than a predetermined value β that is set in advance. During the neutral control, the forward/reverse travel switching device 16 is in the power transmission suppression state and therefore, the turbine blade wheel 14t is in an idling state. Thus, the turbine blade wheel 14t is forced to rotate with the rotation of the pump vane wheel 14, which causes the rotation speed ratio e to increase during the neutral control. Thus, the rotation speed ratio determination section 170 also functions as the securing section that determines whether the neutral control is normally performed. Because the flow rate of the working fluid required by the torque converter 14 is small when the rotation speed ratio e is large, the rotation speed ratio determination section 170 also functions as the section that determines whether the flow rate required by the torque converter 14 is small. The predetermined value β is determined in advance through experiments and/or calculations and is set as the threshold value of the rotation speed ratio e, which threshold value is used when the neutral control is performed.

In the hydraulic control circuit 101 of this embodiment, the oil pump 28 includes the first pump 110 and the second pump 112 as described above. During normal travel, the switching hydraulic pressure $P_{SL}$, is not output from the switching solenoid valve SL and therefore, the input port 116 and the first output port 118 of the switching valve 114 shown in FIG. 4 are allowed to communicate with each other. Thus, the working fluid discharged from the two ports of the first and second pumps 110 and 112 is supplied to the source pressure supply hydraulic line 86. When the working fluid discharged from the two ports of the first and second pumps 110 and 112 is supplied to the source pressure supply hydraulic line 86 in this way, a load is applied to each pump and the load applied is large in the entire oil pump 28. On the other hand, during the neutral control, the flow rate of the working fluid required in the hydraulic pressure control circuit 101 is smaller than that of the working fluid required during normal travel and therefore, it is possible to reduce the amount of discharge from the oil pump 28.

While the neutral control is performed, a discharge capacity reduction section 172 reduces the capacity of discharge from the oil pump 28 that is driven by the engine 12. Specifically, when it is determined with the use of the neutral control condition determination section 166, the engine rotation determination section 168, and the rotation speed ratio determination section 170 that the neutral control is being performed, the discharge capacity reduction section 172 outputs, to the hydraulic pressure control circuit 101, the command signal $S_S$ for switching the hydraulic lines in the switching valve 114 to allow the input port 116 and the second output port 120 to communicate with each other. Thus, the switching hydraulic pressure $P_{SL}$ is output from the switching solenoid valve SL, so that the spool in the switching valve 114 is moved in the other direction to allow the input port 116 and the second output port 120 to communicate with each other. When the hydraulic pressure lines in the switching valve 114 are switched in this way, the working fluid is supplied to the source pressure supply hydraulic line 86 through a single output port (one port) of the first pump 110 alone.

When the input port 116 and the second output port 120 of the switching valve 114 are allowed to communicate with each other, the working fluid discharged from the second pump 112 is supplied, as the lubrication oil, to the various lubricated elements LUB of the vehicle power transmission apparatus 10. When the working fluid from the second pump 112 is supplied to the various lubricated elements LUB, the hydraulic pressure from the source pressure supply hydraulic line 86 is not applied to the second pump 112 and the load applied to the second pump 112 (oil pump load) is reduced as compared to the case where the working fluid is supplied to the source pressure supply hydraulic line 86, so that the load applied to the oil pump 28 is also reduced as a whole. Thus, the engine output control section 158 further reduces the amount of fuel injection into the engine 12. Although the second output port 120 is connected to the lubrication oil line 119 to the various lubricated elements LUB, a configuration may be employed, in which the working fluid is directly returned to the oil pan 81. The load applied to the second pump 112 is also reduced when the second port 120 is connected to the input port 116 of the switching valve 114 so that the working fluid is circulated.

Even during neutral control, a certain flow rate is required. The required flow rate is secured by the working fluid discharged from the first pump 110. In this way, the first pump 110 is designed to secure at least the flow rate that is required when the neutral control is performed. The flow rate that is required when the neutral control is performed is determined through experiments and/or calculations in advance. Design is made so that the maximum flow rate that is required during travel is secured by the first and second pumps 110 and 112.

Figure 8:
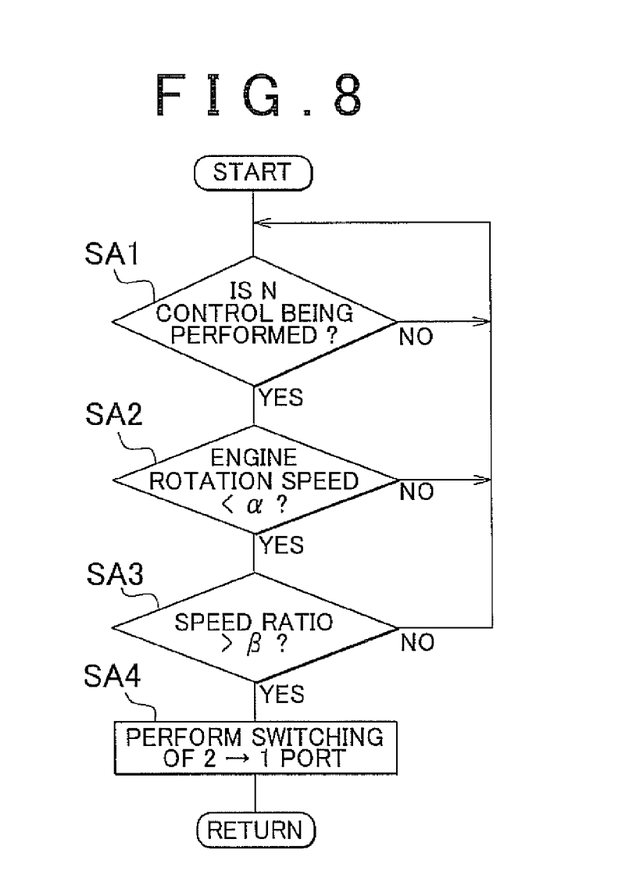
FIG. 8 is a flow chart for explaining a main portion of control operation performed by the electronic control device shown in FIG. 3, that is, control operation for improving fuel economy by reducing load applied to an oil pump during neutral control.

FIG. 8 is a flow chart for explaining the main portion of the control operation performed by the electronic control device 50, that is, the control operation for improving the fuel economy by reducing the load applied to the oil pump 28 during neutral control. This process is repeatedly performed in a very short cycle of about a few milliseconds to several dozen milliseconds, for example.

In the step SA1 (hereinafter "step" will be omitted) corresponding to the neutral control section 164 and the neutral control condition determination section 166, it is determined whether the neutral control is being performed. Specifically, it is determined whether the neutral control conditions, such as that the foot brake pedal is depressed and the vehicle speed is equal to or lower than a predetermined value when the shift lever 74 is at the travel position, are satisfied, which shows that the neutral control is being performed. When NO in SA1, the process returns to SA1 and the same determination is performed until the determination result in SA1 becomes positive. When YES in SA1, it is determined in SA2 corresponding to the engine rotation speed determination section 168 whether the engine rotation speed $N_E$ is lower than the predetermined value α that is set in advance. When NO in SA2, it is determined that the neutral control is cancelled and in this case, the process returns to SA1 and it is determined again whether the neutral control is being performed. When YES in SA2, it is determined in SA3 corresponding to the rotation speed ratio determination section 170 whether the rotation speed ratio e of the torque converter 14 (rotation speed of turbine blade wheel 14t)/(rotation speed of pump vane wheel 14p) is higher than the predetermined value β. When NO in SA3, it is determined that the neutral control is cancelled and in this case, the process returns to SA1 and it is determined again whether the neutral control is being performed.

When YES in SA3, the hydraulic lines in the switching valve 114 are switched to allow the input port 116 and the second output port 120 to communicate with each other and the working fluid discharged from the output port (one port) of the first pump 110 is supplied to the source pressure supply hydraulic line 86 in SA4 corresponding to the discharge capacity reduction section 172. Thus, the working fluid from the second pump 112 is supplied to the lubrication oil line 119 through which the working fluid is supplied to the various lubricated elements LUB. As a result, as the load (oil pump load) applied to the oil pump 28 (second pump 112) is reduced, the amount of fuel injection into the engine 12 is reduced, so that the fuel economy is further improved.

As described above, this embodiment includes the discharge capacity reduction section 172 that, during neutral control, reduces the discharge capacity of the oil pump 28 that is driven by the engine 12, so that the oil pump load is reduced. Thus, the load applied to the engine 12 is reduced and it is possible to further reduce the engine output, so that it is possible to further improve the fuel economy.

According to the embodiment, when the neutral control is performed, the discharge capacity reduction section 172 switches the switching valve 114 so that the working fluid discharged from the second pump 112 is supplied to the lubrication oil line 119 and therefore, the working fluid discharged from the second pump 112 is not supplied to the source pressure supply hydraulic line 86 of the hydraulic pressure control circuit 101. Thus, the oil pump load applied to the second pump 112 is reduced and the load applied to the oil pump 28 is therefore reduced as a whole.

According to this embodiment, the working fluid that is supplied from the second pump 112 to the lubrication oil line 119 is supplied as the lubrication oil of the vehicle power transmission apparatus 10, which prevents the hydraulic pressure from being applied to the second pump 112, so that the pump load applied to the second pump 112 is reduced.

According to this embodiment, the vehicle power transmission apparatus 10 includes the belt-type continuously variable transmission 18 in the power transmission path. Thus, by reducing the amount of discharge during neutral control in the belt-type continuously variable transmission 18 that requires a high flow rate, that is, the belt-type continuously variable transmission 18 that causes a large load on the oil pump 28, it is possible to effectively improve the fuel economy.

Another embodiment of the invention will be described below. In the following description, the portions that are common to those of the above-described embodiment are designated by the same reference numerals and the explanation of these portions will be omitted.

Figure 9:
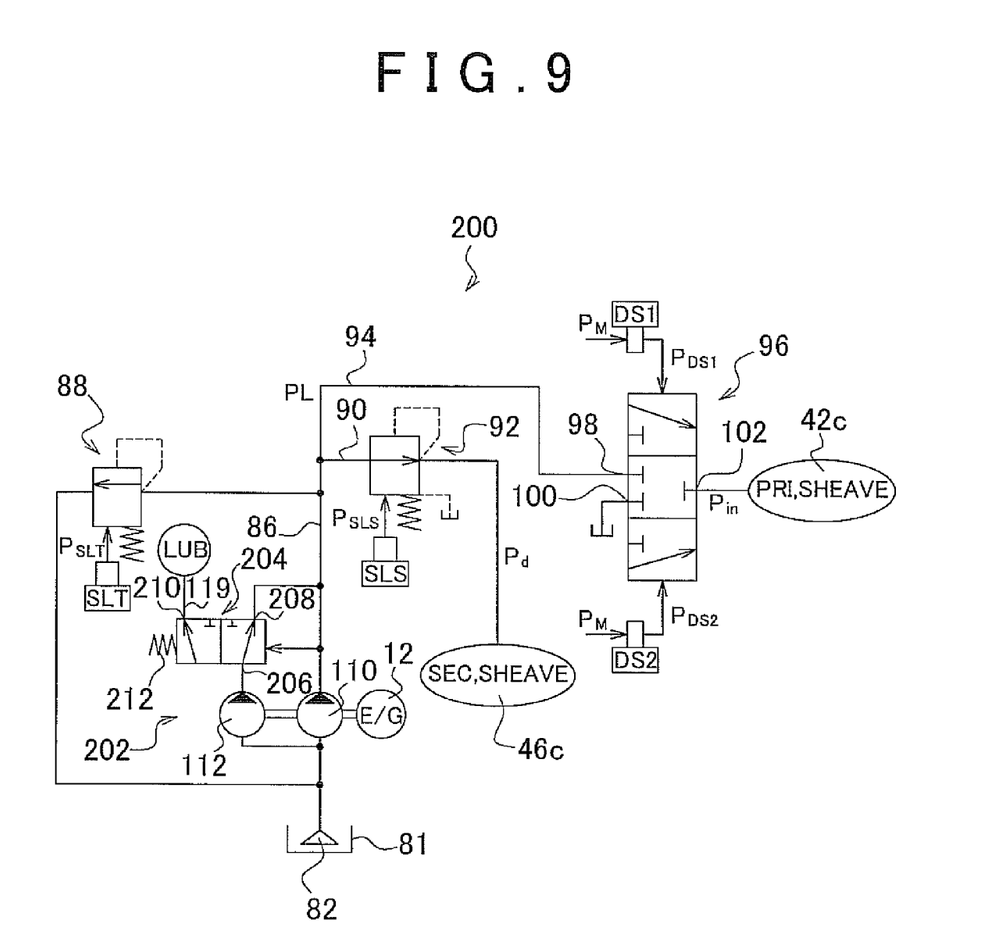
FIG. 9 is a diagram schematically showing part of a hydraulic pressure control circuit that is another embodiment of the invention.

FIG. 9 is a diagram schematically showing part of a hydraulic pressure control circuit 200 that is another embodiment of the invention. When the hydraulic pressure control circuit 101 of the above-described embodiment and the hydraulic pressure control circuit 200 of this embodiment are compared, the only difference is an oil pump 202 and the other portions are the same as those of the above embodiment. Thus, the oil pump 202 only will be described and the description of other portions will be omitted.

The oil pump 202 includes the first and second pumps 110 and 112 that are driven by the engine 12. As in the case of the above-described embodiment, the destination, to which the working fluid discharged from the second pump 112 is supplied, is selected via a switching valve 204. The switching valve 204 includes: an input port 206, to which the working fluid discharged from the second pump 112 is supplied; a first output port 208 that communicates with the source pressure supply hydraulic line 86; a second output port 210 that communicates with the lubrication oil line 119, through which the working fluid is supplied to the various lubricated elements LUB (not shown) of the power transmission apparatus 10; a spool (not shown) that switches the hydraulic lines in the switching valve 204; a hydraulic chamber (not shown) that urges the spool in the one direction by receiving the hydraulic pressure from the source pressure supply hydraulic line 86; and a spring 212 that urges the spool in the other direction.

While the hydraulic pressure that is equal to or higher than a predetermined value δ is supplied from the source pressure supply hydraulic line 86 to the hydraulic chamber in the switching valve 204, the spool is moved in the one direction against the urging force of the spring 212 and therefore, the input port 206 and the first output port 208 are allowed to communicate with each other as shown in FIG. 9. Thus, the working fluid discharged from the second pump 112 is supplied to the source pressure supply hydraulic line 86 through the first output port 208. On the other hand, when the hydraulic pressure in the source pressure supply hydraulic line is reduced below the predetermined value δ, the spool is moved in the other direction by the urging force of the spring 212 and the hydraulic lines are switched so that the input port 206 and the second output port 210 are allowed to communicate with each other. Thus, the working fluid discharged from the second pump 112 is supplied to the various lubricated elements LUB of the power transmission apparatus 10 through the lubrication oil line 119.

During neutral control, the engine rotation speed $N_E$ is reduced and therefore, the amount of discharge of the working fluid is reduced, so that the hydraulic pressure in the hydraulic chamber (not shown) that receives the hydraulic pressure of the source pressure supply hydraulic line 86 of the switching valve 204, is reduced. Thus, when, based on the engine rotation speed $N_E$ that is the setting used during neutral control, the discharge capacity of the oil pump 202 is designed so that the hydraulic pressure in the source pressure supply hydraulic line 86 is equal to or lower than the predetermined value δ, the spool of the switching valve 204 is moved in the other direction to switch the hydraulic lines during neutral control. When this occurs, the input port 206 and the second output port 210 are allowed to communicate with each other and the working fluid from the second pump 112 is supplied to the lubrication oil line 119. Thus, the load applied to the second pump 112 (pump load) is reduced and the engine output control section 158 further reduces the amount of fuel injection into the engine 12. The predetermined value δ, which is determined through experiments and/or calculations in advance, is determined so that the urging force of the spring 212 exceeds the thrust force of the spool caused by the hydraulic pressure in the source pressure supply hydraulic line 86 during neutral control. Design is appropriately changed with the elastic force of the spring 212, the pressure receiving area of the spool, etc. taken into consideration.

As described above, not only when the discharge amount is electrically changed, but also when the discharge amount is mechanically changed, the effects similar to those obtained by the above-described embodiment are obtained and it is possible to omit the electromagnetic valves, such as the switching valve or the like.

Although embodiments of the invention have been described in detail with reference to drawings, the invention can be implemented in other modes.

For example, in the above-described embodiments, the two pumps that are driven by the engine 12 are provided and the destination, to which the working fluid discharged from the second pump 112 is supplied, is appropriately selected via the switching valve 114, so that the load applied to the second pump 112 is changed. However, the invention can be appropriately applied as long as the pump is a variable displacement pump capable of varying the discharge capacity of the hydraulic fluid.

In the above-described embodiment, the belt-type continuously variable transmission is used as the automatic transmission. However, in the invention, the automatic transmission is not limited to the belt-type continuously variable transmission but may be applied to a finite gear ratio type automatic transmission, a toroidal continuously variable transmission, etc. In other words, the invention can be applied as long as the vehicle power transmission apparatus includes an automatic transmission capable of performing the neutral control.

Although the destination, to which the working fluid from the second pump 112 is supplied, is the various lubricated elements of the power transmission apparatus 10 in the above-described embodiments, the destination may be a device that is used for another purpose, such as the device for controlling the lock-up of the lock-up clutch 26, as long as the device imposes a relatively small load on the second pump 112.

The above-described embodiments are merely examples and the invention can be implemented in other modes obtained through various alterations and/or modifications based on the knowledge of those skilled in the art.

For example, a configuration may be employed, in which the oil pump includes a first pump and a second pump that are each driven by the engine, wherein working fluid discharged from the first pump is supplied to a source pressure supply hydraulic line of a hydraulic pressure control circuit at all times, and working fluid discharged from the second pump is selectively supplied to the source pressure supply hydraulic line of the hydraulic pressure control circuit or another hydraulic line, through a switching valve. In addition, in this configuration, during neutral control, the discharge capacity reduction device switches the switching valve so that the working fluid discharged from the second pump is supplied to the another hydraulic line.

According to this configuration, during neutral control, the discharge capacity reduction device switches the switching valve so that the working fluid discharged from the second pump is supplied to the another hydraulic line, so that the working fluid discharged from the second pump is not supplied to the source pressure supply hydraulic line of the hydraulic pressure control circuit. Thus, the oil pump load applied to the second pump is reduced and the load applied to the oil pump is therefore reduced as a whole.

The switching valve may be electrically controlled via an electromagnetic valve. This makes it possible to quickly switch the switching valve in response to the execution of the neutral control.

Alternatively, a configuration may be employed, in which the switching valve includes a hydraulic chamber that receives hydraulic pressure and the hydraulic lines are mechanically switched based on the magnitude of the hydraulic pressure. This makes it possible to omit the electromagnetic valve or the like because the switching valve is mechanically switched.

The working fluid supplied from the second pump to the another hydraulic line may be supplied as lubrication oil for the vehicle power transmission apparatus.

According to this configuration, the working fluid supplied from the second pump to the another hydraulic line is supplied as lubrication oil for the vehicle power transmission apparatus, so that the pump load applied to the second pump is reduced.

The vehicle power transmission apparatus may include a belt-type continuously variable transmission in the power transmission path.

According to this configuration, the vehicle power transmission apparatus includes the belt-type continuously variable transmission in the power transmission path. Thus, by reducing the amount of discharge during neutral control in the belt-type continuously variable transmission that requires a high flow rate, that is, the belt-type continuously variable transmission that causes a large load on the oil pump, it is possible to effectively improve fuel economy.

What is claimed is:

1. A controller for a vehicle power transmission apparatus including an engagement device that is provided between an engine and a driving wheel in a power transmission path, the controller comprising:

a neutral control section that, when a predetermined neutral control condition is satisfied while a travel position is selected, brings the engagement device into a slip state or a release state to bring the power transmission path into a power transmission suppression state so that an idling load of the engine is suppressed; and a discharge capacity reduction device that, while neutral control is performed, reduces a discharge capacity of an oil pump that is driven by the engine.

2. The controller according to claim 1, wherein:

the oil pump includes a first pump and a second pump that are each driven by the engine, wherein working fluid discharged from the first pump is supplied to a source pressure supply hydraulic line of a hydraulic pressure control circuit at all times, and working fluid discharged from the second pump is selectively supplied to the source pressure supply hydraulic line of the hydraulic pressure control circuit or to another hydraulic line, through a switching valve; and, during neutral control, the discharge capacity reduction device switches the switching valve so that the working fluid discharged from the second pump is supplied to the another hydraulic line.

3. The controller according to claim 2, wherein the switching valve includes an electromagnetic valve that is electrically controlled.

4. The controller according to claim 2, wherein the switching valve includes a mechanical valve having a hydraulic chamber that receives hydraulic pressure and hydraulic lines that are mechanically switched based on a magnitude of the hydraulic pressure.

5. The controller according to claim 2, wherein the working fluid supplied from the second pump to the another hydraulic line is supplied as lubrication oil for the vehicle power transmission apparatus.

6. The controller according to claim 1, wherein the vehicle power transmission apparatus includes a belt-type continuously variable transmission in the power transmission path.

7. A method of controlling a vehicle power transmission apparatus including an engagement device that is provided between an engine and a driving wheel in a power transmission path, the method comprising:

performing neutral control in which, when a predetermined neutral control condition is satisfied while a travel position is selected, the engagement device is brought into a slip state or a release state to bring the power transmission path into a power transmission suppression state so that an idling load of the engine is suppressed; and, while the neutral control is performed, reducing a discharge capacity of an oil pump that is driven by the engine.

8. The method of controlling a vehicle power transmission apparatus according to claim 7, wherein:

the oil pump includes a first pump and a second pump that are each driven by the engine, wherein working fluid discharged from the first pump is supplied to a source pressure supply hydraulic line of a hydraulic pressure control circuit at all times, and working fluid discharged from the second pump is selectively supplied to the source pressure supply hydraulic line of the hydraulic pressure control circuit or another hydraulic line, through a switching valve; and the method further comprises, during neutral control, switching the switching valve so that the working fluid discharged from the second pump is supplied to the another hydraulic line.

* * * * *